United States Patent [19]
Rodrigues, Jr. et al.

[11] Patent Number: 4,798,151
[45] Date of Patent: Jan. 17, 1989

[54] FURROW OPENING POINT

[75] Inventors: John G. Rodrigues, Jr.; Gale Rettkowski, both of Wilbur, Wash.

[73] Assignee: R & R Innovations, Inc., Wilbur, Wash.

[21] Appl. No.: 92,180

[22] Filed: Sep. 1, 1987

[51] Int. Cl.⁴ .......................... A01C 5/08; A01C 23/02
[52] U.S. Cl. ........................................ 111/73; 111/80; 172/196; 172/199
[58] Field of Search .......................... 111/73, 80, 7, 34; 172/196, 199, 200, 176

[56] References Cited

U.S. PATENT DOCUMENTS

| | | | |
|---|---|---|---|
| 715,556 | 12/1902 | Crowder | 111/80 |
| 1,229,604 | 6/1917 | Garst | 111/80 |
| 1,247,763 | 11/1917 | White | 111/80 |
| 1,906,351 | 5/1933 | White | 111/73 |
| 2,058,539 | 10/1936 | Welty et al. | 111/73 |
| 2,159,652 | 5/1939 | Brunner | 111/73 |
| 2,351,173 | 6/1944 | White | 111/85 |
| 2,889,788 | 6/1959 | van Dorn | 111/80 |
| 3,296,985 | 1/1967 | Shelton | 111/7 |
| 3,396,685 | 8/1968 | Meiners | 111/7 |
| 3,605,657 | 9/1971 | Brannan | 111/7 |
| 3,797,418 | 3/1974 | Bridger, Jr. | 111/73 |
| 3,854,429 | 12/1974 | Blair | 111/7 |
| 3,908,567 | 9/1975 | Brannan | 111/7 |
| 4,278,036 | 7/1981 | Buchele | 111/73 |
| 4,388,878 | 6/1983 | Demzin | 111/86 |
| 4,417,530 | 11/1983 | Kopecky | 111/73 |
| 4,565,141 | 1/1986 | Kopecky | 111/7 |
| 4,580,507 | 4/1986 | Dreyer et al. | 111/73 |
| 4,592,294 | 6/1986 | Dietrich, Sr. et al. | 111/7 |
| 4,607,581 | 8/1986 | Kopecky | 111/73 |
| 4,638,748 | 1/1987 | Kopecky | 111/80 |
| 4,653,412 | 3/1987 | Clarke | 111/73 |
| 4,721,047 | 1/1988 | Stauch | 111/73 |

FOREIGN PATENT DOCUMENTS

| | | | |
|---|---|---|---|
| 2016756 | 6/1978 | Fed. Rep. of Germany | 111/80 |
| 1360964 | 7/1974 | United Kingdom | 111/7 |

Primary Examiner—Deborah L. Kyle
Assistant Examiner—Stephen Johnson
Attorney, Agent, or Firm—Wells, St. John & Roberts

[57] ABSTRACT

A furrow opening point 40 is described for attachment directly to the seed boot of a hoe type seed drill between the split packer wheels. The furrow opening point 40 has an elongated body 50 that extends from an upper fertilizer receiving portion 56 to a bottom edge 54 of the soil engaging portion 52. The soil engaging portion has an upper section 61 and a lower section 62 for forming a two-tier furrow. A liquid fertilizer passageway 90 extends downward through the elongated body to the bottom edge 54 for dispensing liquid fertilizer at the base of the furrow. A dry granular fertilizer passageway 96 extends downward through the elongated body to a bottom surface 84 for dispensing dry granular fertilizer down a vertical channel formed along the trailing face 80 to the base of the furrow. A leveling section 100 forward of the seed opening 30 levels and firms the soil in the upper portion of the two-tier furrow to form a good seed bed.

6 Claims, 3 Drawing Sheets

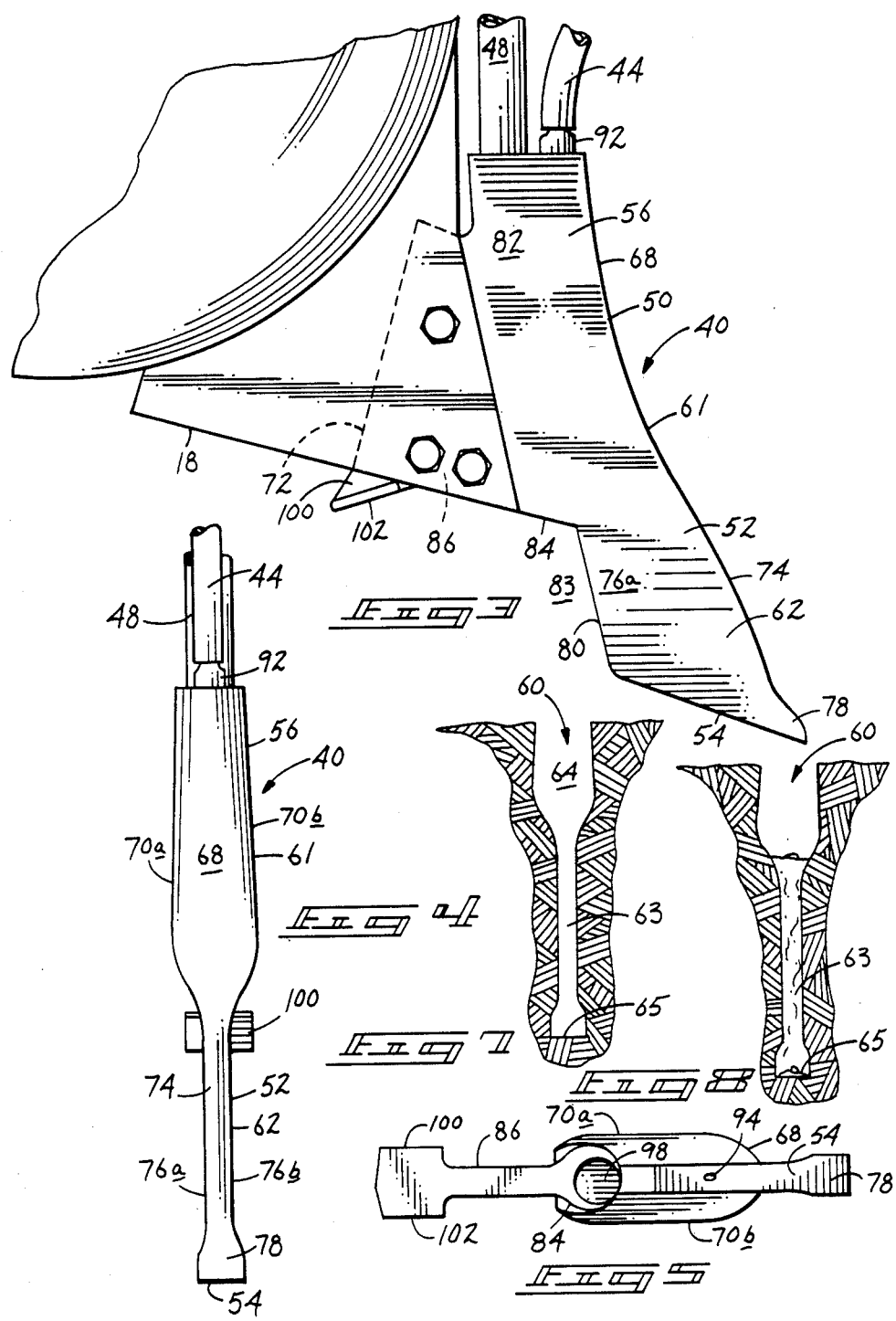

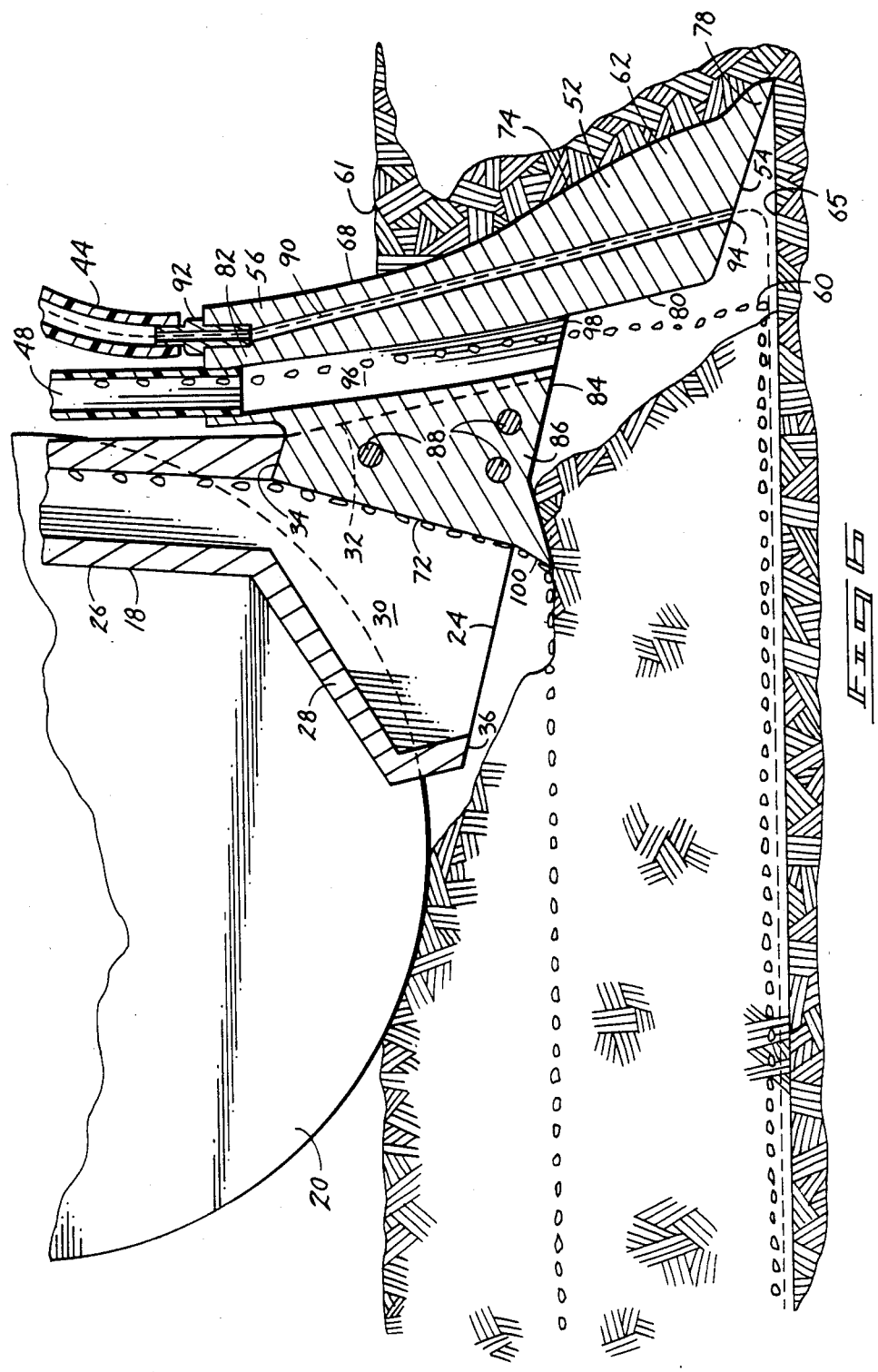

FURROW OPENING POINT

TECHNICAL FIELD

This invention relates to hoe type seed drills and more particularly to furrow opening points attachable to seed boots of such drills for applying liquid and dry granular fertilizers to the soil in conjunction with seed application.

BACKGROUND OF THE INVENTION

Conventionally, seed and/or fertilizer are fed down common tubes to be deposited together unsegregated and comingled within the furrow. It has been found that the application of fertilizer too close to the seed causes burning or killing of the seed during germination or during the initial growth stage of the seed.

It has been found to be advantageous to place the fertilizer in a deep band beneath the seed so as not to burn the seed and to enable the roots of the seed to grow downward into the fertilized soil band for maximum growth.

Although it is relatively easy to construct a special or custom planter that has the capability of applying fertilizer in a deep band below the seed, it has been found difficult to provide a simple attachment to the seed boot of a hoe type seed drill without extensive modifications of the seed drill that is capable of accurately applying the fertilizer at the proper depth.

Examples of custom design drill devices for applying fertilizer in a deep band beneath the seed line are disclosed in the following U.S. patents: Brunner, U.S. Pat. No. 2,159,652 granted May 23, 1939; White, U.S. Pat. No. 2,351,173 granted June 13, 1944; Bridger, Jr., U.S. Pat. No. 3,797,418 granted Mar. 19, 1974; Buchele, U.S. Pat. No. 4,278,036 granted July 14, 1981; Kopecky, U.S. Pat. No. 4,417,530 granted Nov. 29, 1983; Kopecky, U.S. Pat. No. 4,565,141 granted Jan. 21, 1985; Dreyer, et al, U.S. Pat. No. 4,580,507, granted Apr. 8, 1986; and Kopecky, U.S. Pat. No. 4,607,581 granted Aug. 26, 1986.

Several devices have been envisioned for attaching to the rear of a furrow opening point for applying fertilizer below a seed line. Representative of such devices are shown in U.S. patents issued to Welty, et al., U.S. Pat. No. 2,058,539 granted Oct. 27, 1936; Brannan, U.S. Pat. No. 3,908,567 granted Sept. 30, 1975; and Demzin, U.S. Pat. No. 4,388,875 granted June 21, 1983. Additionally, there are a number of devices for applying liquid or dry granular fertilizer at various depths in which fertilizer tubes are principally mounted to the back of soil opening points. Such devices are illustrated in the following patents: Shelton, U.S. Pat. No. 3,296,985 granted Jan. 10, 1967; Meiners, U.S. Pat. No. 3,396,685 granted Aug. 13, 1968; Brannan, U.S. Pat. No. 3,605,657 granted Sept. 20, 1971; and Dietrich, Sr., et al., U.S. Pat. No. 4,592,294 granted June 3, 1986. However, none of the above devices are intended or designed for attachment to the seed boot of a hoe type seed drill for applying liquid and dry granular fertilizer in a deep band beneath the seed that is deposited through the seed boot as positioned between the split packer wheels.

On occasion, farmers would attach fertilizer tubes to the rear side of the seed delivery tube or boot for the purpose of dropping fertilizer onto the ground over the seed bed. Recently, Mr. D. E. Wilkins, an agricultural engineer with the Columbia Basin Agriculture Research Center associated with Oregon State University in Pendleton, Oreg. developed what is termed the "Wilkins" deep furrow opener for placement of fertilizer utilizing a split packer wheel seed drill in which the furrow opening point is attached to the seed boot or tube of the seed drill. In the Wilkins' configuration, the fertilizer tube extends downwardly along the rear or back of the furrow opening point but in front of the seed boot for attempting to space the liquid fertilizer in a deep band below the seed. Although the device has been partially successful, it has several disadvantages and is erratic in performance. It is found that frequently the furrow does not fill up over the fertilizer and the seed drops into the deep portion of the furrow causing the seed to burn from the liquid fertilizer. This device does not have the capability of applying dry granular fertilizer below the seed. Additionally, it is found that the fertilizer tube would wear very rapidly and had to be frequently replaced. The Wilkins' deep furrow opener is described in U.S. patent application Ser. No. 876,047, filed June 19, 1986, entitled "Placement of Fertilizer Below Seed With Minimum Soil Disturbance".

One of the principal objects of this invention is to provide a furrow opening point that is attachable to the seed boot of a hoe type drill to enable the seed drill to apply both liquid and dry granular fertilizers in a deep band below the seed. The invention is particularly applicable to "no-till" or "minimum till" operations.

A further object of this invention is to provide a furrow opening point that is capable of applying both liquid and dry granular fertilizer in a deep band below the seed in which the furrow opening device accurately fills the furrow over the fertilizer prior to the application of the seed so that the seed is separated and above the fertilizer. This invention separates the seed and fertilizer into two bands that are separated by sufficient soil distance to stimulate growth without interfering with seed germination to maximize yield. Furthermore, the furrow opening point displaces the vegetation on the surface of the soil in a "no-till" atmosphere and prevents the vegetation from interfering with the accurate formation of the furrow or the application of the fertilizer or seed.

These and other objects and advantages of this invention would become apparent upon reading the following detailed description of a preferred embodiment.

BRIEF DESCRIPTION OF THE DRAWINGS

A preferred embodiment of the invention is illustrated in the accompanying drawings, in which:

FIG. 3 is a fragmentary side view of the present invention illustrating the furrow opening point mounted to the seed boot of a split packer wheel;

FIG. 4 is a front view of the furrow opening point illustrating its profile from the front;

FIG. 5 is a bottom view of the furrow opening point illustrated in FIG. 4;

FIG. 6 is a vertical cross-sectional view of the furrow opening point mounted to the packer wheel illustrating the configuration of the various surfaces and passageways in relationship to the application of fertilizer in a deep band below a seed line;

FIG. 7 is a vertical cross-sectional view of the furrow as it is initially opening prior to the application of fertilizer;

FIG. 8 is a figure similar to FIG. 7 except showing the lower portion of the two-tier furrow being closed with soil over the fertilizer providing a bed or base on which the seed is deposited.

DETAILED DESCRIPTION OF THE PREFERRED EMBODIMENT

The following disclosure of the invention is submitted in compliance with the constitutional purpose of the patent laws "to promote the progress of science and useful arts" (Article 1, Section 8).

Figure 1:
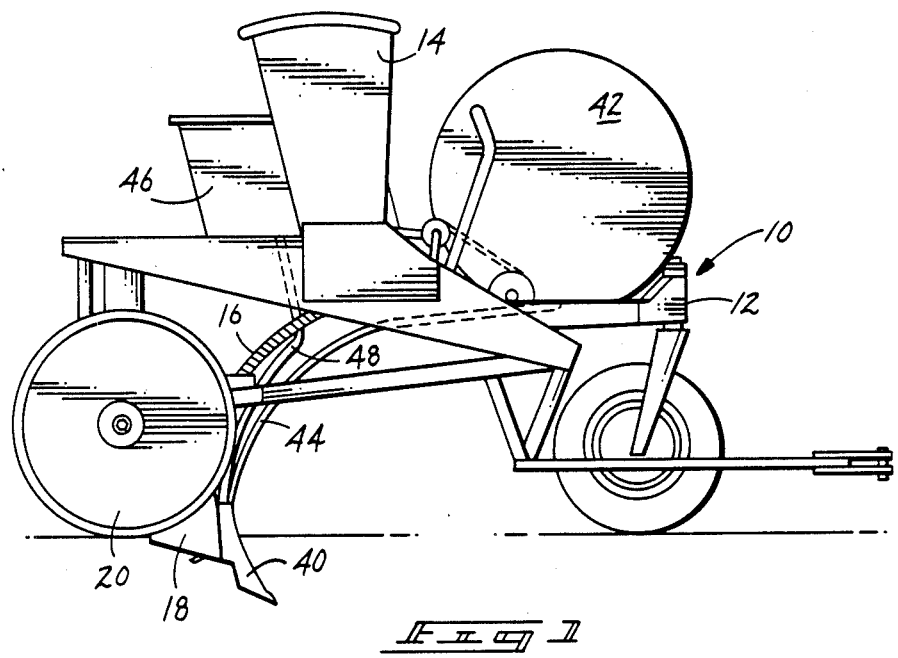
FIG. 1 is a side view of a split packer wheel seed drill on which the inventive furrow opening point is shown mounted on a seed boot positioned between a split packer wheel.
Figure 2:
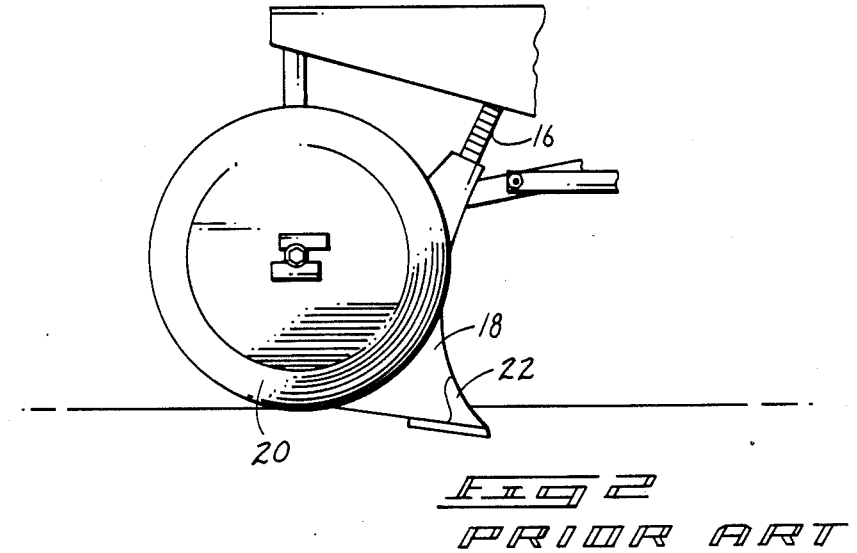
FIG. 2 is a fragmentary side view of the conventional furrow opening point mounted to the seed boot positioned between a split packer wheel.

Turning now to the drawings, there is illustrated in FIG. 1 a split packer wheel seed drill generally designated with the numeral 10 that has a mobile frame 12 for supporting a seed container 14. Seed from the container 14 is directed through a seed conduit 16 to a seed boot 18 that projects into the ground for depositing seed at a desired seed level. The seed boot 18 is very narrow and fits between a split packer wheel 20. As shown in FIG. 2 a conventional furrow opening point 22 is mounted on the front of a seed boot 18 for opening a furrow enabling the seed to drop into the furrow for planting. The device as illustrated in FIG. 2 is deficient in that it does not have the feature of applying fertilizer at a deep band below the seed. Various configurations have been utilized for adding fertilizer tubes along the back of the seed boot 18 for injecting fertilizer at various heights with respect to the seed line. The seed boot 18 has a very thin body 24, shown in vertical longitudinal cross-section in FIG. 6. The seed boot 18 has an upper portion 26 and lower flared portion 28 that projects below the soil or ground level for depositing the seed at a seed line. The seed boot 18 has a large passageway 30 for enabling the seed to drop by gravity through the boot to the base of the opened furrow. The passageway 30 is particularly large to enable conventional fertilizer tubes to extend downwardly through the passageway for applying fertilizer in the conventional manner at the same elevation as the seed. As indicated, this process is unsatisfactory and is overcome by the instant invention.

The seed boot has a forward edge 32 with a bracket opening or slot 34 formed therein for receiving a furrow opening point for forming the desired furrow ahead of the boot 18. The bracket opening 34 has bolt holes formed therethrough to enable the opening point to be mounted thereto. The seed boot 18 includes a trailing edge 36. It should be noted that the seed boot 18 fits between the split packer wheel components and is very thin in profile so as not to rub against the packer wheels.

The present invention is illustrated in the preferred embodiment in the furrow opening point generally designated with the numeral 40 that is illustrated in FIGS. 1, 3-6. The furrow opening point 40 is in communication with a liquid fertilizer container 42 that is mounted on the mobile frame 12 for supplying liquid fertilizer to the opened furrow. A liquid fertilizer conduit 44 extends from the liquid fertilizer container 42 to the furrow opening point 40. Additionally, the furrow opening point 40 is in communication with the dry granular fertilizer container 46 that is likewise mounted on the mobile frame 12. A dry granular fertilizer conduit 48 extends from the container 46 to the furrow opening point 40 for supplying dry granular fertilizer to the furrow. The furrow opening point 40 is unique in its configuration and has an elongated body 50 extending from a bottom edge 54 of a soil engaging portion 52 upward to a fertilizer receiving portion 56. When the furrow opening point 40 is in the working position, the soil engaging portion 52 is below ground level for opening the furrow whereas the fertilizer receiving portion 56 is above ground level for receiving the liquid and dry granular fertilizers.

The furrow opening point 40 as it passes through the soil makes a very thin two-tier furrow 60 that requires rather small draft requirements and minimizes soil disturbance below the seed line. The two-tier furrow 60 is formed as the soil engaging portion 52 of the furrow opening point 40 knives forward through the soil.

The soil engaging portion 52 has an upper section 61 that forms an upper segment 64 of the two-tier furrow 60 and a lower knife section or blade 62 that forms a lower segment 63 of the furrow 60. It should be noted that the lower segment 63 is considerably narrower than the upper segment 64 as illustrated in FIGS. 7 and 8 with the soil quickly closing almost directly behind the lower section 62. The lower segment has a base 65 at which the liquid and dry granular fertilizer are applied. The interface between the lower segment 63 and the upper segment 64 define the seed line. Preferably the distance between the base 65 and the interface between the lower and upper segment 63 and 64 is greater than 1 inch. Optimum results have been achieved when the separation has been between 2" and 3".

The upper section 61 of the furrow opening point 40 has a front face 68 with side surfaces 70a and 70b. The side surfaces 70a and 70b extend rearward in a substantially parallel orientation to a rear face 72 that is positioned in the seed boot 18 as illustrated in FIG. 6 with the rear face 72 communicating with the large passageway 30 to direct the seed downward to the seed line.

The lower section 62 of the furrow opening point 40 includes a front face 74 that extends downward and forward of the front face 68 in a smooth curved orientation. The lower section 62 includes side surfaces 76a and b that extend rearward in a substantially parallel orientation to a trailing face 80. The front face 74 and side surfaces 76a and b extend downward to the bottom edge 54 with the lower section terminating in a forward tip 78 that initially contacts the soil. Any debris or trash that is encountered moves upward along the front face surfaces 74 and 68 displacing the trash and facilitates good penetration. Such a feature is extremely important in "no-till" environments. It should be particularly noted that the transition from side surfaces 76 to the side surfaces 70 is very smooth and inclined upward and outward to displace any trash upward and outward from the furrow without the trash becoming hung up or caught at the interface between the lower section 62 and the upper section 61.

The lower section 62 as it passes through the soil merely opens the soil with the soil flowing along the side surfaces 76a and 76b closing the furrow almost immediately behind the trailing face 80. The closing furrow forms a vertical V-shaped soil channel directly behind the trailing face 80 to permit dry granular fertilizer to fall down the soil channel to bottom of the furrow.

The upper section 61 has a rearward projection or dry granular fertilizer subsection 82 that projects rearward forming a recess 83 beneath the rearward projection and behind the trailing face 80 as illustrated in FIGS. 3 and 6. The rearward projection 82 has a bottom surface 84. The rearward projection 82 includes a bracket portion 86 that extends rearward into the bracket opening 34 for attaching the furrow opening point 40 to the seed boot 18. The bracket portion 86 includes bolt apertures 88 for receiving bolts to releasably secure the furrow opening point 40 to the seed boot 18. It should be noted that the lower section 62 of the furrow opening point 40 is spaced considerably forward of the bracket portion 86 to enable soil to fill in the lower segment 63 of the two-tier furrow 60 prior to the application of the seed from the seed boot 18 as illustrated in FIG. 6.

The furrow opening point 40 includes a liquid fertilizer passageway 90 that extends through the elongated body 50 from the fertilizer receiving portion 56 to the bottom edge 54. The liquid fertilizer passageway 90 is angled forward and is formed integrally within the elongated body 50. Preferably the passageway 90 has a diameter of approximately one quarter of an inch. A connecting fixture 92 is mounted in the fertilizer receiving portion 56 for connecting the passageway 90 to the liquid fertilizer conduit 44. The passageway 90 includes an opening 94 formed in the bottom surface 54 for dispensing liquid fertilizer into the lower segment 63 of the two-tier furrow 60 considerably forward of the seed opening 24. FIG. 6 illustrates liquid fertilizer being dispensed from the opening 94 at the base 65 of the two-tier furrow 60.

The furrow opening point 40 further includes a dry granular fertilizer passageway 96 extending through the rearward projection 82 that is angeled forward to the bottom surface 84 with an opening 98 immediately behind the trailing face 80 for dispensing dry granular fertilizer along the trailing edge 80 into the furrow 60. The opening 98 is angled forward immediately behind the trailing edge 80 to drop the dry granular fertilizer along the rear of the trailing edge 90 so that the fertilizer will drop through the vertical soil channel to the base 65 of the furrow 60 as illustrated in FIG. 6. The diameter of the dry granular fertilizer passageway 96 is considerably greater than the diameter of the liquid fertilizer passageway 90. And particularly the passageway 96 has a diameter that is greater than the thickness between the side surfaces 76a and b to accommodate a wide variety of dry granular fertilizers.

The furrow opening point 40 further includes an auxiliary furrow leveling device in the form of a wing 100 that extends downward and rearward from the bracket portion 86 below the seed foot 18 but immediately in front of seed passageway 30. The furrow closing device 100 has an inclined surface 102 that extends outward from the bracket portion 86 for engaging the soil at the seed line and leveling the soil in the lower segment 63 of the furrow to further cover the fertilizer and to form a level bed at a precise elevation above the fertilizers, defining the seed line. The furrow leveling device 100 is positioned a substantial distance behind the trailing face 80 and provides a very efficient means for leveling the closed lower segment 63 of the furrow prior to the application of the seed so that the fertilizer and seed are precisely positioned and not intermixed. Because the lower section 62 of the opening point is very narrow and positioned considerably forward of the boot, the lower segment of the furrow naturally closes as the soil flows past the lower section 62.

It is evident that the furrow opening 40 has a very thin profile and additionally reduces the draft requirements to enable the seed drill to be pulled over the ground for applying both fertilizers and the seed below ground level with the fertilizer being placed approximately 2 or more inches below the seed line. The furrow opening point 40 further very efficiently provides for good penetration and trash clearance of vegetation that resides on the top of the soil under "no-till" or "minimum till" conditions. Furthermore it is evident that the furrow opening point 40 may be readily mounted to the conventional split packer wheel seed drill 10 without any modifications of the seed boot 18. The furrow opening point 40 with the integral liquid fertilizer passageway 90 and dry granular fertilizer passageway 96 provides excellent placement of both the liquid and dry granular fertilizer below the seed to provide exceptional root and plant development contributing to more winter and frost hardiness in the plant growth which reduces the amount of seed required. Additionally, it may reduce the amount of fertilizer required since the fertilizer is sufficiently and precisely placed for maximum utilization. Furthermore the fertilizer is kept away from the weeds and is beneficial only for the roots of the seed.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims, appropriately interpreted in accordance with the doctrine of equivalents.

We claim:

1. A fertilizer furrow opening device for attachment to a seed boot of a seed drill in which the seed boot has a seed passageway extending downward therethrough terminating in a seed drop opening along a lower profile, said opening device comprising:

an elongated body including a soil engaging portion, for extending from below a soil level when the seed drill is in a soil working position to form a deep, narrow two-tier furrow in front of the seed boot, said elongated body also extending upward to a fertilizer receiving portion, above the soil level to receive both a liquid fertilizer conduit and a dry granular fertilizer conduit;

wherein the soil engaging portion has an upper soil engaging section that extends downward from the fertilizer receiving portion for forming an upper segment of the two-tier furrow to receive seed from the seed drop opening along a seed line formed at a base of the upper segment of the two-tier furrow;

wherein the soil engaging portion has a lower knife section that extends downward and forward from the upper soil engaging section terminating in a bottom edge having a leading tip for forming a narrow lower segment of the two-tier furrow to receive both liquid and dry granular fertilizers therein substantially below the seed line at a base of the lower segment of the two-tier furrow;

wherein the upper soil engaging section and the lower knife section of the furrow opening device have leading faces for initially opening the soil, in which the leading face of the lower knife section has a substantially thinner horizontal front profile than the leading face of the upper soil engaging section so that the lower segment of the two-tier furrow is substantially narrower than the upper segment of the two-tier furrow; and wherein the upper soil engaging section includes a rear face and the lower knife section includes a trailing face opposite to the leading faces;

said elongated body having a mounting bracket portion extending rearward of the soil engaging portion for mounting the furrow opening device to the seed boot with the lower knife section extending substantially forward and below the seed drop opening;

said elongated body having a fluid passageway formed therein extending from the fertilizer receiving portion through the soil engaging portion to the bottom edge of the lower knife section for communicating with the fluid fertilizer conduit and directing the fluid fertilizer down through the elongated body including the lower knife section and exiting from an opening in the bottom edge of the lower knife section to deposit the fluid fertilizer into the lower segment of the two-tier furrow forward of the seed drop opening and below the seed line; and said elongated body having a dry granular fertilizer passageway formed therein extending from the fertilizer receiving portion through a dry granular fertilizer subsection of the device and terminating in a dry granular fertilizer opening adjacent the trailing face of the lower knife section to direct dry granular fertilizer from the dry granular fertilizer conduit through the elongated body to the dry granular fertilizer opening and into the lower segment of the two-tier furrow along the trailing face of the lower knife section.

2. The furrow opening device as defined in claim 1 wherein the upper section of the soil engaging portion has a prescribed thickness that is greater than the thickness of the lower knife section and extends rearward of the trailing face of the lower knife section and includes a dry granular fertilizer subsection rearward of the trailing face of the lower knife section;

wherein the dry granular fertilizer passageway has a diameter that is substantially greater than the diameter of the fluid fertilizer passageway.

3. The furrow opening device as defined in claim 2 wherein the thickness of the lower knife section of the soil engaging portion is less than the diameter of the dry granular fertilizer passageway.

4. The furrow opening device as defined in claim 1 wherein the trailing face of the knife lower section of the soil engaging portion is forward and downward from the mounting bracket, and wherein the furrow opening device has a furrow leveling element extending outward to the sides of the elongated body intermediate the trailing face of the lower knife section of the soil engaging portion and the seed drop opening for closing the lower segment of the two-tier furrow with soil to cover the liquid and dry granular fertilizer and form the seed line at the base of the upper segment of the two-tier furrow.

5. The furrow opening device as defined in claim 2 further comprising a furrow leveling element rearward of the dry granular subsection for leveling the lower segment of the two-tier furrow after the dry granular fertilizer is deposited therein to provide a firm seed bed prior to the deposition of the seeds in the upper furrow segment.

6. The furrow opening device as defined in claim 1 wherein the leading face of the upper section of the soil engaging portion has a substantially greater width than the leading face of the lower knife section of the soil engaging portion and wherein the leading faces extend downward and forward in a smooth curve and wherein the leading faces have a gradual interface to facilitate entry of the leading tip through the soil and to facilitate movement of vegetation from the furrow opening device to prevent entrapment of vegetation such as straw on the furrow opening device as it passes through the soil.

* * * * *